RICHARD P. THOMAS, OF SAN FRANCISCO, CALIFORNIA.

Letters Patent No. 85,623, dated January 5, 1869.

IMPROVED COMPOSITION TO BE USED IN THE MANUFACTURE OF SOAP.

The Schedule referred to in these Letters Patent and making part of the same.

*To all whom it may concern:*

Be it known that I, RICHARD P. THOMAS, of the city and county of San Francisco, State of California, have invented an Improved Mode of Utilizing Resinous Substances; and I do hereby declare that the agents used in accomplishing the object, together with complete and full directions for using them, in order to produce the desired result, in the best manner known to me, are given in the following specification.

The object of my invention is to utilize the various resins and resinous substances, such as rosin, the various gums, asphaltum, and coal-tar, by rendering them soluble in water, and thus increasing their availability in the various arts and sciences.

To effect this, I employ silicate of soda, or soluble glass, which, when diluted to a certain point and heated, is rendered capable of mixing with the melted resin, so as to form a thick paste, which, in the case of rosin, is especially valuable for the purpose of manufacturing soap, either with or without the admixture of other substances.

I will now proceed to describe minutely my process.

Of silicate of soda, otherwise known as soluble glass, I take a quantity, and dilute it with water to about 15° Baumé. One hundred (100) parts of this solution are elevated to a temperature of 212° Fahrenheit. From thirty (30) to fifty (50) parts of the resin or gum to be used are then melted and mixed with the hot silicate, the two combining and forming a sort of paste, which is soluble in water. This paste may also be mixed, in greater or less proportions, with pipe-clay, silica, lime, sulphate of soda, carbonate of soda, soapstone, and similar substances, when it is intended to amalgamate with saponified fats, tallow, or oils, either in a finished or unfinished state, as employed in soap-making, while its uses for other branches of art are unlimited.

Having thus described my invention,

What I claim as new, and desire to secure by Letters Patent, is—

Utilizing resinous substances, and rendering them soluble in water, by combining them with the substances and in the proportions herein described.

In witness whereof, I have hereunto set my hand and seal.

RICHARD P. THOMAS. [L. S.]

Witnesses:
GEO. H. STRONG,
J. L. BOONE.